(12) United States Patent
Ozawa

(10) Patent No.: US 7,196,307 B2
(45) Date of Patent: Mar. 27, 2007

(54) OPTICAL SENSOR, METHOD OF READING OPTICAL SENSOR, MATRIX-TYPE OPTICAL SENSOR CIRCUIT, AND ELECTRONIC APPARATUS

(75) Inventor: Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

(21) Appl. No.: 11/104,574

(22) Filed: Apr. 13, 2005

(65) Prior Publication Data

US 2005/0258337 A1    Nov. 24, 2005

(30) Foreign Application Priority Data

May 24, 2004    (JP) .............................. 2004-153274

(51) Int. Cl.
| | |
|---|---|
| G01J 1/42 | (2006.01) |
| G01J 1/44 | (2006.01) |
| H01J 40/14 | (2006.01) |
| H03F 3/08 | (2006.01) |

(52) U.S. Cl. .............................. 250/208.2; 250/214 R; 327/514

(58) Field of Classification Search ............ 250/208.1, 250/208.2, 214 R; 345/207; 327/514; 257/292; 348/308
See application file for complete search history.

(56) References Cited

U.S. PATENT DOCUMENTS 6,795,121 B2 *    9/2004    Matsunaga et al. ......... 348/308
6,914,230 B2 *    7/2005    Baer ....................... 250/214.1

FOREIGN PATENT DOCUMENTS

| JP | A 9-082931 | 3/1997 |
|---|---|---|
| JP | A 2001-218112 | 8/2001 |
| JP | A 2001-308306 | 11/2001 |

* cited by examiner

Primary Examiner—Stephone B. Allen
Assistant Examiner—Suezu Ellis
(74) Attorney, Agent, or Firm—Oliff & Berridge, PLC

(57) ABSTRACT

An optical sensor is provided corresponding to a scanning line and a reading line. The optical sensor includes a light-receiving element, a current flowing between both terminals thereof being changed according to the amount of incident light and a transistor whose gate is connected to one end of the light-receiving element, one of a source and a drain being connected to the scanning line and the other being connected to the reading line. In an initialization period in which the scanning line is selected, a predetermined initialization voltage is applied to the gate and, after the application of the initialization voltage ends, a result according to the amount of received light is output based on a voltage on the reading line.

11 Claims, 10 Drawing Sheets

FIG. 2
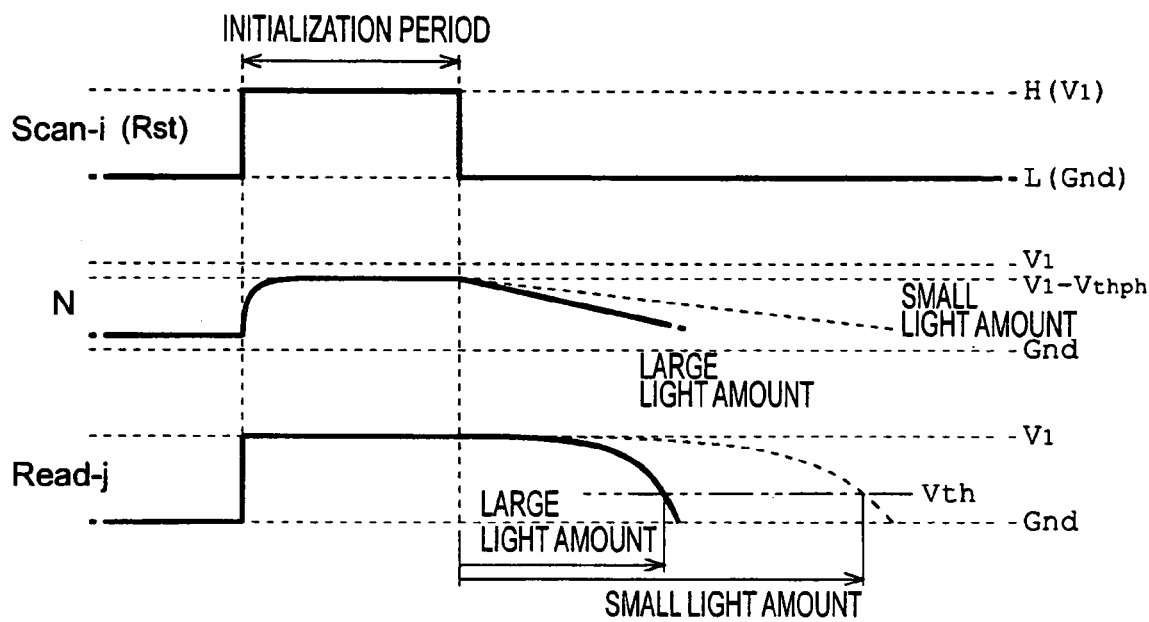
FIG. 3A          FIG. 3B          FIG. 3C
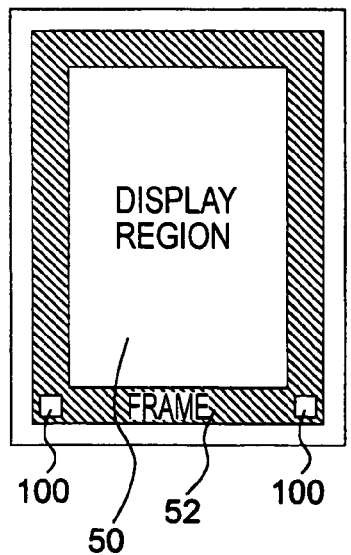
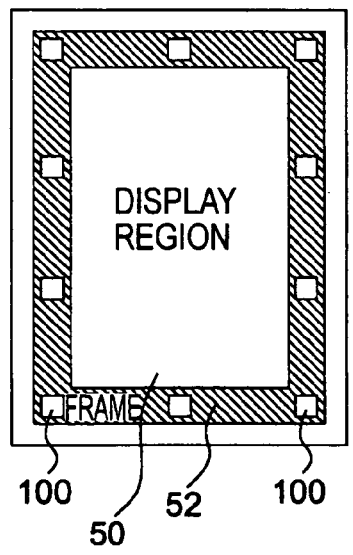
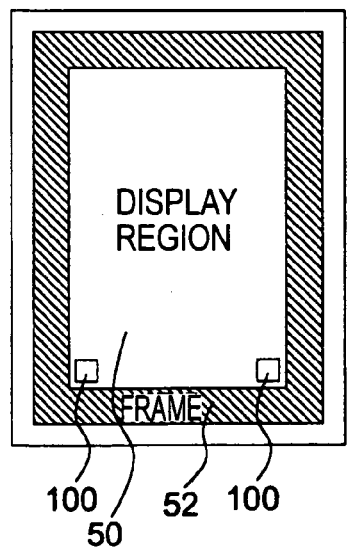

OPTICAL SENSOR, METHOD OF READING OPTICAL SENSOR, MATRIX-TYPE OPTICAL SENSOR CIRCUIT, AND ELECTRONIC APPARATUS

BACKGROUND OF THE INVENTION

1. Technical Field

The present invention relates to a technique that reads an output of a light-receiving element such as a photodiode via a reading line.

2. Related Art

In recent years, a display panel in which liquid crystal elements or organic EL elements are arranged in a matrix shape has been widely used for an electronic apparatus such as a cellular phone, a personal digital assistant, or the like. The display panel is used under various environments, for example, under bright conditions where there is sufficient sunlight, that is, daytime, or under dark conditions where external light is insufficient, that is, at night. For this reason, when brightness or image quality of a display element is constant regardless of external light, there is some inconsistency in that, while the display panel can be easily viewed under some conditions, it can hardly be viewed under other conditions. Accordingly, in such a display panel, it is preferable to detect external light and control the brightness or image quality according to the detection result.

In such a control, a light-receiving element such as a photodiode is used to detect external light. In this case, however, if the light-receiving element is provided separately from the display panel, extra space for mounting the light-receiving element is required in the electronic apparatus. Further, an opening portion needs to be provided in the light-receiving element to detect external light.

As a countermeasure against the above-described problems, a technique in which, in the display panel, light-receiving elements and transistors for selecting the light-receiving elements are formed by using the same process as that of transistors for switching pixels in pairs, such that the display panel itself detects external light, has been proposed. Specifically, the pairs of the light-receiving elements and the transistors are arranged at intersections of scanning lines and reading lines respectively. When one scanning line is selected, the transistors in the pairs disposed on the selected scanning line are turned on. Then, the outputs of the light-receiving elements in the corresponding pairs are read via the reading lines.

In this technique, the detection precision of the light amount is degraded due to the noise mixed into the reading line according to the selection of the scanning line. Accordingly, a technique in which the noise is detected and the detected noise is supplied to the reading line after being inverted, such that the noise present on the corresponding reading line is offset, has been proposed (see Japanese Patent Application Publication No. 9-82931).

However, if the transistors or wiring lines are formed in the display panel, a parasitic capacitance appears on various portions, for example, gates of the transistors or the reading lines. For this reason, when an output signal of the light-receiving element is read, the output of the light-receiving element cannot be accurately extracted at the reading line side due to charging and discharging of the gate capacitance or the parasitic capacitance on the reading line.

SUMMARY

An advantage of the invention is that it provides an optical sensor capable of accurately obtaining a value in which an output of a light-receiving element is reflected, without being influenced by a parasitic capacitance, a method of reading the optical sensor, a matrix-type optical sensor circuit, and an electronic apparatus.

According to a first aspect of the invention, there is provided an optical sensor which is provided corresponding to a scanning line and a reading line. The optical sensor includes a light-receiving element, a current flowing between both terminals thereof being changed according to the amount of incident light, and a transistor whose gate is connected to one end of the light-receiving element, one of a source and a drain being connected to the scanning line and the other being connected to the reading line. In an initialization period in which the scanning line is selected, a predetermined initialization voltage is applied to the gate and, after the application of the initialization voltage ends, a result according to the amount of received light is output based on a voltage on the reading line. According to this configuration, prior to reading, the initialization voltage is applied to the gate of the transistor such that the transistor is initialized. Thus, an influence by a parasitic capacitance of the gate of the transistor can be decreased.

In the invention, it is preferable that the time until the voltage on the reading line reaches a predetermined threshold voltage after the application of the initialization voltage ends is output as the result according to the amount of received light.

In the invention, the optical sensor may further have a switching element that applies a predetermined voltage to the reading line before the result according to the amount of received light is output. According to this configuration, an influence by a parasitic capacitance of the reading line can be decreased.

In the invention, it is preferable that the light-receiving element is a diode element that is forward biased in the initialization period to apply the initialization voltage to the gate of the transistor and is reverse biased after the initialization period ends. According to this configuration, since the voltage is applied to the gate of the transistor by the forward-biased light-receiving element such that the transistor is initialized, the configuration can be simplified.

In the invention, the optical sensor may further have a second switching element that is turned on in the initialization period to bring the transistor into diode connection and to apply a voltage according to a threshold voltage of the transistor to the gate of the transistor. According to this configuration, an influence by a threshold voltage characteristic of the transistor can be decreased.

It is preferable that the second switching element is turned on or off according to the level of a voltage which is supplied to the scanning line.

In the invention, the optical sensor may further have a capacitor, one end of which is connected to the reading line, and a third switching element that electrically shorts both ends of the capacitor in the above-described initialization period. After the application of the initialization voltage ends, a voltage present on the other end of the capacitor is output as the result according to the amount of received light.

Further, the optical sensor can be conceptualized as a method of reading an optical sensor.

According to a second aspect of the invention, there is provided a matrix-type optical sensor circuit having cell circuits that are provided corresponding to a plurality of scanning lines and a plurality of reading lines, a scanning circuit that selects one scanning line among the plurality of scanning lines in an initialization period, deselects all scanning lines in a subsequent detection period, and selects another scanning line in a next initialization period, and a reading circuit that reads a voltage on a reading line or a current flowing in the reading line in the detection period as an output signal of an optical sensor which is disposed on the selected scanning line. Each of the cell circuits has a light-receiving element, a current flowing between both terminals thereof being changed according to the amount of incident light, and a transistor whose gate is connected to one end of the light-receiving element, one of a source and a drain thereof being connected to the scanning line and the other being connected to the reading line. According to this configuration, similarly to the above-described optical sensor, the influence by the parasitic capacitance of the gate of the transistor can be decreased.

Further, there is provided an electronic apparatus having the above-described optical sensor or the above-described matrix-type optical sensor circuit. Thus, the optical sensor or the matrix-type optical sensor circuit can be easily formed in a display panel.

BRIEF DESCRIPTION OF THE DRAWINGS

The invention will be described with reference to the accompanying drawings, wherein like numbers reference like elements, and wherein:

FIG. 2 is a diagram showing an operation of the optical sensor;

FIG. 3A is a plan view showing an example of an arrangement of cell circuits of the optical sensor;

FIG. 3B is a plan view showing another example of an arrangement of cell circuits of the optical sensor;

FIG. 3C is a plan view showing still another example of an arrangement of cell circuits of the optical sensor;

DESCRIPTION OF THE EMBODIMENTS

Hereinafter, embodiments of the invention will be described with reference to the drawings.

First Embodiment

Figure 1:
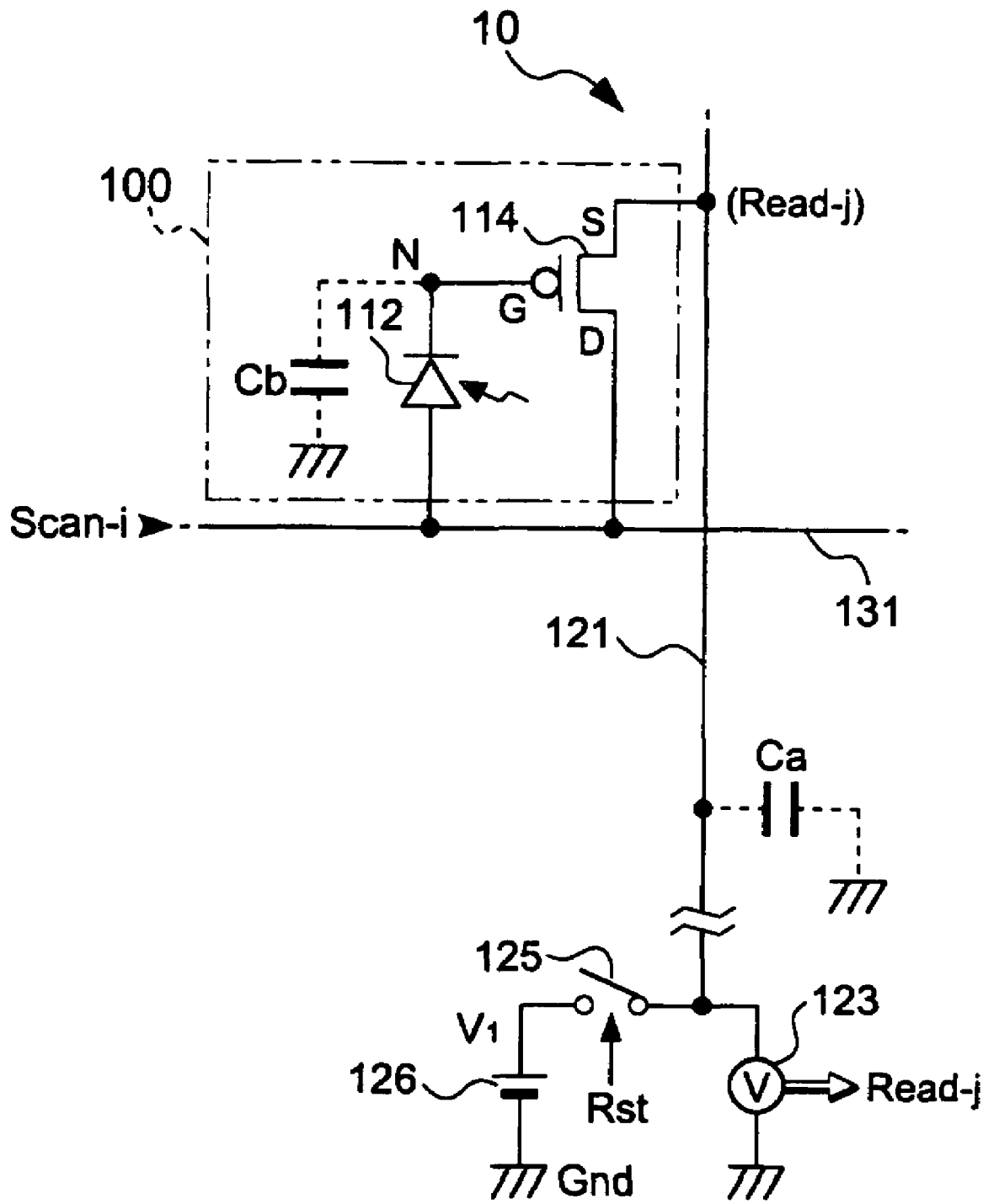
FIG. 1 is a diagram showing a configuration of an optical sensor according to a first embodiment of the invention.

First, an optical sensor according to a first embodiment of the invention will be described. FIG. 1 is a diagram showing essential parts of the optical sensor.

For example, as shown in FIG. 3A, two cell circuits 100 included in an optical sensor 10 shown in FIG. 1 are provided at two of four corners of a frame 52 around a display region 50 on a substrate of a liquid crystal panel or a organic EL panel. Here, the display region 50 means a region in which pixels are arranged to contribute to display. Moreover, the display panel is an active matrix type in which the pixels are switched by TFTs. Here, the detailed configuration of the pixel has no relation to the invention and thus the description thereof will be omitted.

In FIG. 1, the cell circuit 100 is provided corresponding to an intersection of a scanning line 131 and a reading line 121 and has a photodiode 112 and a TFT 114. Among them, the TFT (transistor) 114 is a p-channel type and is formed with the same process as that of a transistor which switches the pixel in the display panel. A drain (D) of the TFT 114 is connected to the scanning line 131 to which a scanning signal Scan-i is supplied and a source (S) of the TFT 114 is connected to the reading line 121. Moreover, the meaning of the suffix (-i) of the scanning signal Scan will be described later.

On the other hand, a gate of the TFT 114 is connected to a cathode of the photodiode 112. The photodiode 112 is a PIN type, for example, and is formed with the same process as that of the TFT 114 or the TFT which switches the pixel in the display panel. Further, an anode of the photodiode 112 is connected to the scanning line 131.

Moreover, for convenience of the description, the gate of the TFT 114 (the cathode of the photodiode 112) is referred to as a node N and a parasitic capacitance of the node N is represented by Cb, as shown by the dotted line in FIG. 1.

Further, the photodiode 112 is an example of a light-receiving element. Any element can be used only if a current flowing therein is changed according to the amount of received light.

On the other hand, one end of the reading line 121 is connected to one end of a voltmeter 123 and one end of a switch 125. Here, the reading line 121 is formed on the display panel and has a parasitic capacitance. In FIG. 1, the parasitic capacitance is represented by Ca in the dotted line.

The voltmeter 123 measures a potential difference (voltage) between a potential Gnd as a voltage reference and the reading line 121 and outputs the measurement result Read-j to a control system (not shown). Moreover, the meaning of the suffix (-j) of the measurement result will be described later.

The switch 125 (first switching element) is turned on between one end and the other end only when a control signal Rst is at the H level. The other end is connected to a positive terminal of a reference voltage source 126 which supplies a voltage $V_1$.

Moreover, a negative terminal of the reference voltage source 126 is connected to the potential Gnd. Further, the control signal Rst is supplied from any part (not shown) and becomes the H level when the scanning signal Scan-i becomes the voltage $V_1$ (H level).

Next, the operation of the optical sensor 10 according to the above-described configuration will be described. FIG. 2 is a voltage waveform diagram of respective parts for illustrating the operation.

As shown in FIG. 2, in the optical sensor 10, first, in an initialization period, the scanning signal Scan-i becomes the H level. For this reason, the photodiode 112 is forward biased. Here, when the threshold voltage in the forward bias direction of the photodiode 112 is represented by $V_{thph}$, a voltage $(V_1-V_{thph})$ obtained by subtracting the threshold voltage $V_{thph}$ from the voltage $V_1$ corresponding to the H level is applied to a node N (the gate of the TFT 114 and the cathode of the photodiode 112) as an initialization voltage. Moreover, the initialization voltage $(V_1-V_{thph})$ is held by the parasitic capacitance Cb.

On the other hand, when the scanning signal Scan-i becomes the H level in the initialization period, the control signal Rst becomes the H level, and thus the switch 125 is turned on. For this reason, the reading line 121 also becomes the voltage $V_1$.

Next, when the initialization period ends and the scanning signal Scan-i becomes the L level to change to the potential Gnd, the photodiode 112 is reverse biased. For this reason, a current according to the amount of received light flows in the photodiode 112 and electric charge stored in the capacitance Cb leaks. Accordingly, the voltage on the node N is lowered from the initialization voltage $(V_1-V_{thph})$. At this time, the amount of incident light on the photodiode 112 is large, and thus the voltage lowering rate of the node N is increased.

As the voltage of the node N is lowered, a resistance between the source and the drain of the p-channel TFT 114 is decreased. For this reason, electric charge stored in the capacitance Ca of the reading line 121 leaks through a path of the reading line 121, the TFT 114, and the scanning line 131. Thus, the larger the amount of received light on the photodiode 112 is, the faster the voltage on the reading line 121 is lowered from the voltage $V_1$ as time passes.

Therefore, by analyzing the change in voltage on the reading line 121 after the initialization period, a value in which the amount of incident light on the photodiode 112 is reflected can be acquired. For example, in the control system, the measurement result Read-j may be compared to the predetermined threshold voltage Vth and the time until the voltage Read-j reaches the threshold voltage Vth after the initialization period may be measured. Thus, the value in which the amount of incident light on the photodiode 112 is reflected can be acquired. Then, the control system can adjust the brightness of the pixel or image quality according to the acquired value to properly control the characteristics of the display panel according to the use environment.

In the embodiment, after the initialization voltage $(V_1-V_{thph})$ is applied to the gate of the TFT 114 in the initialization period, the output according to the amount of received light of the photodiode 112 is input to the gate. Thus, an influence by the parasitic capacitance Cb of the TFT 114 can be prevented. Similarly, after the reading line 121 is precharged to the voltage $V_1$ in the initialization period, the output according to the amount of received light of the photodiode 112 is read. Thus, the value in which the amount of incident light on the photodiode 112 is reflected can be accurately acquired without being influenced by the parasitic capacitance Ca of the reading line 121.

That is, when the amount of received light is repetitively measured at predetermined intervals under the environment in which the amount of received light is changed hourly, in a configuration in which the initialization is not performed, the gate and the reading line 112 are held at any voltage by the capacitance Cb and the capacitance Ca, respectively, at each measurement timing. Accordingly, the initial states are not confirmed, and thus the change in voltage according to charging and discharging cannot be accurately measured. On the contrary, in the embodiment, the states of the gate voltage and the voltage on the reading line 112 are confirmed in the initialization period respectively, such that the output according to the amount of received light of the photodiode 112 can be read. As a result, even when the parasitic capacitances Ca and Cb are present, the influences can be prevented.

Moreover, in the above-described embodiment, the reading line 121 has the voltage $V_1$ in the initialization period. However, since it is sufficient that the reading line may be set to a predetermined voltage, the voltage on the reading line 121 is not limited to the voltage $V_1$.

Further, in the display panel, in addition to the arrangement of the optical sensors 10 shown in FIG. 3A, for example, a plurality of optical sensors 10 may be uniformly arranged on the frame 52, as shown in FIG. 3B. Further, as shown in FIG. 3C, the optical sensors 10 are arranged at two or more among four corners of the display region 50.

Second Embodiment

Next, an optical sensor according to a second embodiment of the invention will be described with reference to FIG. 4.

Figure 4:
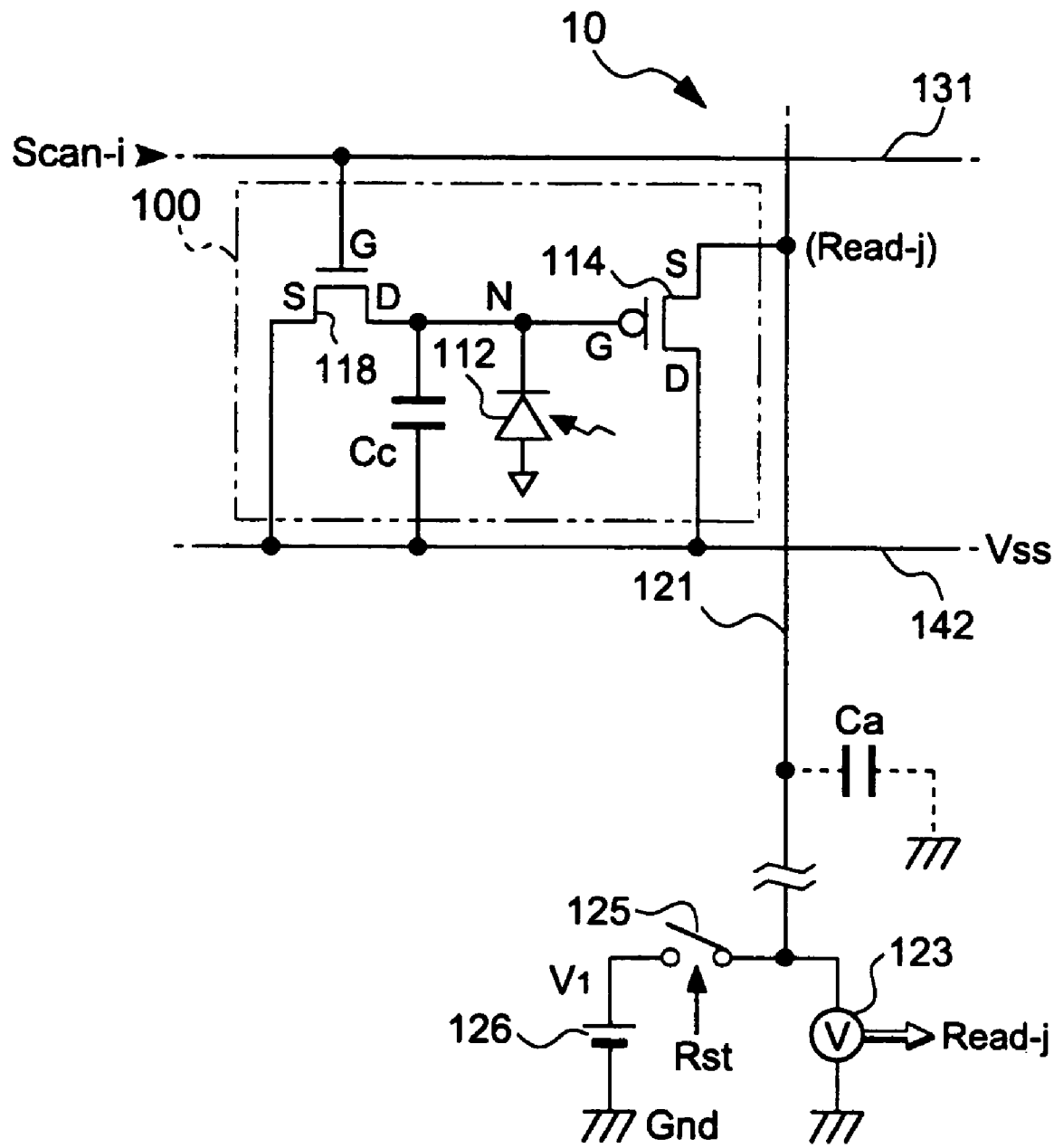
FIG. 4 is a diagram showing a configuration of an optical sensor according to a second embodiment of the invention.

A cell circuit 100 shown in FIG. 4 is different from that of the first embodiment shown in FIG. 1 in that a TFT 118 (second switching element) and a feeding line 142 are provided. Further, as for the TFT 18, a drain of the TFT 118 is connected to the node N, a source of the TFT 118 is connected to the feeding line 142, and a gate of the TFT 118 is connected to the scanning line 131. Next, as for the feeding line 142, the feeding line 142 is intended to feed a low-level voltage Vss of a power supply voltage, to which the drain of the TFT 114 is connected.

Further, the anode of the photodiode 112 is biased by a constant voltage and a capacitor Cc is electrically interposed between the node N and the feeding line 142.

Other elements are the same as those of the first embodiment.

Figure 5:
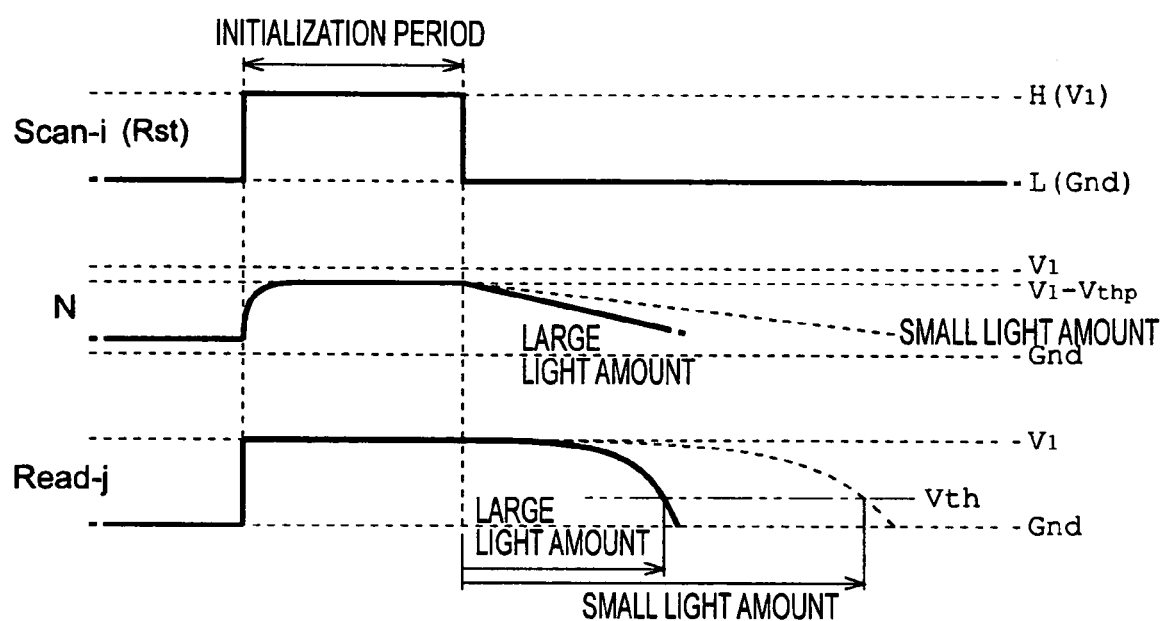
FIG. 5 is a diagram showing an operation of the optical sensor.

Next, the operation of the optical sensor 10 according to the above-described configuration will be described. FIG. 5 is a voltage waveform diagram of respective parts for illustrating the operation.

First, in the initialization period, the scanning signal Scan-i becomes the H level, and the TFT 118 is turned on, such that the TFT 114 is brought into diode connection. On the other hand, the reading line 121 is initialized to the voltage $V_1$ in the initialization period, similarly to the first embodiment. For this reason, the current flows in a path of the reading line 121, the TFT 114, and the feeding line 142, and thus the node 114 has a voltage $(V_1-V_{thp})$ obtained by subtracting the threshold voltage $V_{thp}$ of the TFT 114 from the voltage $V_1$, substantially regardless of the amount of received light of the photodiode 112. In the second embodiment, the voltage $(V_1-V_{thp})$ is the initialization voltage. Then, the voltage $(V_1-V_{thp})$ of the node N is held by the capacitor Cc.

Next, when the initialization period ends and the scanning signal Scan-i becomes the L level, the TFT 118 is turned off, such that a current according to the amount of received light flows in the photodiode 112. Then, electric charge stored in the capacitor Cc leaks, the voltage of the node N is lowered from the initialization voltage $(V_1-V_{thp})$.

Here, as the voltage of the node N is lowered, a resistance between the source and the drain of the p-channel TFT 114 is decreased. For this reason, the electric charge stored by the capacitance Ca of the reading line 121 leaks in a path of the reading line 121, the TFT 114, and the feeding line 142. Thus, the larger the amount of received light on the photodiode 112 is, the faster the voltage of the reading line 121 is lowered from the voltage $V_1$ as time passes.

Therefore, in the second embodiment, by analyzing the change in voltage on the reading line 121 after the initialization period, the value in which the amount of incident light on the photodiode 112 is reflected can also be acquired.

Further, in the second embodiment, the gate of the TFT 114 is changed from the voltage ($V_1-V_{thp}$), that is, the voltage in which the threshold voltage $V_{thp}$ of the TFT 114 is reflected. Thus, the threshold voltage $V_{thp}$ of the TFT 114 does not influence on the change in voltage on the reading line 121.

This will be described in detail. When the change in voltage on the node N is $\Delta V$ at a certain time after the initialization period ends, the voltage Vg on the node N at the certain time is represented by the following equation.

$$Vg = V_1 - V_{thp} - \Delta V \quad (a)$$

On the other hand, the current I flowing between the source and the drain of the TFT 114 is determined by the voltage Vg of the node N and is represented by the following equation.

$$I = (\beta/2)(V_1 - Vg - V_{thp}) \quad (b)$$

Moreover, in this equation, $\beta$ is a gain factor of the TFT 114.

Arranging by substituting the equation (b) for the equation (a), the following equation is obtained.

$$I = (\beta/2)(\Delta V)^2 \quad (c)$$

As shown in the equation (c), the current I flowing in the TFT 114 after the initialization period is determined only by the change in voltage $\Delta V$, not depending on the threshold voltage $V_{thp}$ of the TFT 114. Therefore, the voltage on the reading line 121 is changed only by the change in voltage $\Delta V$ (that is, the amount of received light of the photodiode 112), not depending on the threshold voltage $V_{thp}$ of the TFT 114. Thus, even when a plurality of cell circuits 100 are provided, an influence by the variation of the threshold voltage $V_{thp}$ characteristic of the TFT 114 can be prevented.

Moreover, in the above-described first and second embodiments, the TFT 114 is the p-channel type, but it may be an n-channel type. When the TFT 114 is the n-channel type, connections of the source and the drain are changed.

Third Embodiment

Next, an optical sensor according to a third embodiment of the invention will be described with reference to FIG. 6.

Figure 6:
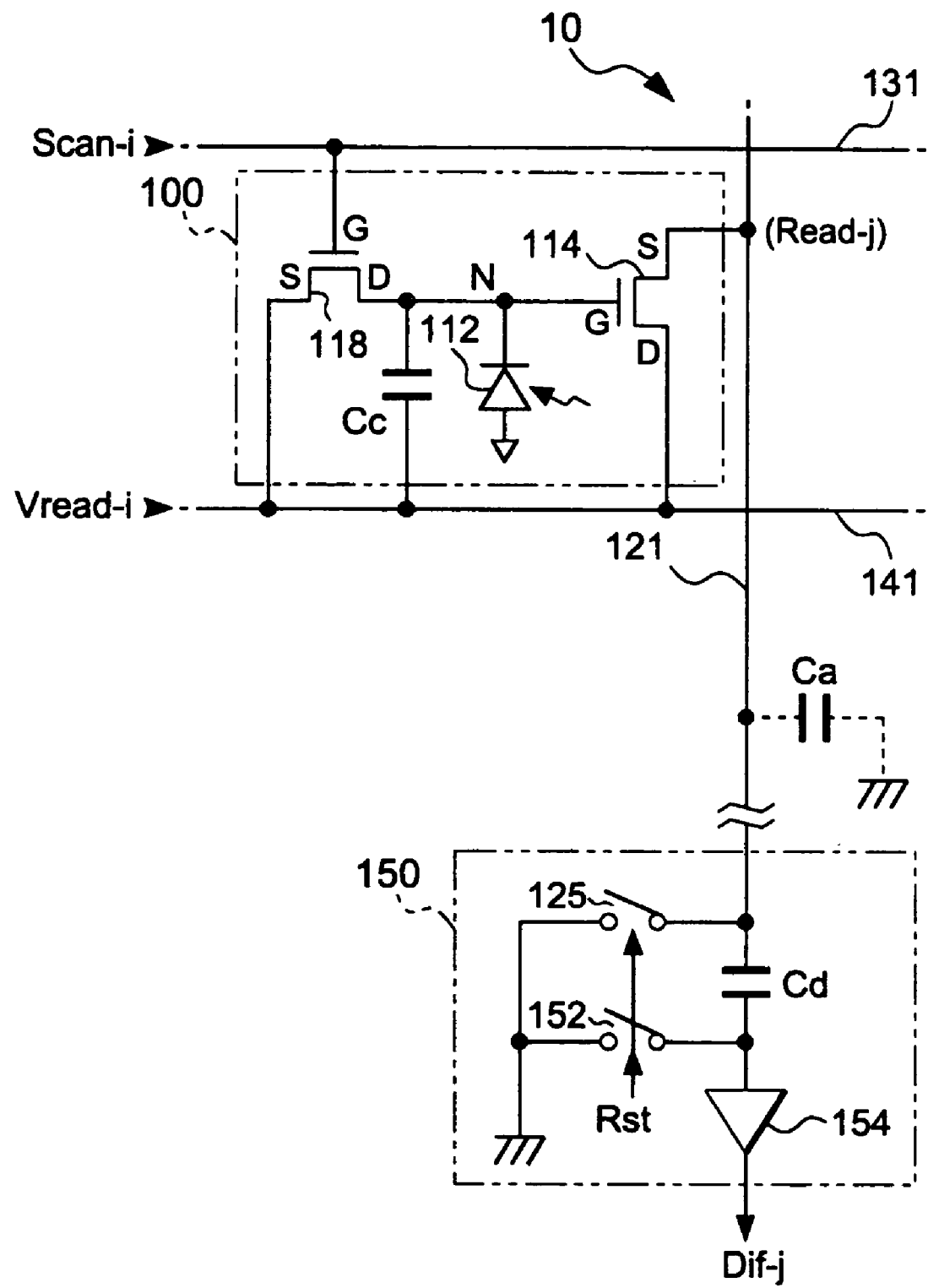
FIG. 6 is a diagram showing a configuration of an optical sensor according to a third embodiment of the invention.

A cell circuit 100 shown in FIG. 6 is different from that of the second embodiment shown in FIG. 4 in that an auxiliary scanning line 141 to which an auxiliary scanning signal Vread-i is supplied is provided, instead of the feeding line 142, and a differential voltage output circuit 150 is provided at one end of the reading line 121. Moreover, in the embodiment, the TFT 114 is the n-channel type.

As for the differential voltage output circuit 150, the differential voltage output circuit 150 includes a capacitor Cd, switches 125 and 152 (third switching element), and amplifier 154. Among them, one end of the capacitor Cd is connected to the one end of the reading line 121 and one end of the switch 125 respectively. On the other hand, the other end of the capacitor Cd is connected to one end of the switch 152 and an input terminal of the amplifier 154. When the control signal Rst becomes the H level, the switches 125 and 152 are turned on together. The other ends of both switches 125 and 152 are commonly connected to the potential Gnd. That is, when the switch 125 is turned on, the reading line 121 is initialized to the ground potential Gnd. Further, when the switch 152 is turned on, electric charge stored in the capacitor Cd is cleared.

The amplifier 154 is intended to amplify a voltage present on the other end of the capacitor Cd to output the amplified voltage as a differential voltage Dif-j.

Other parts are the same as those of the second embodiment.

Figure 7:
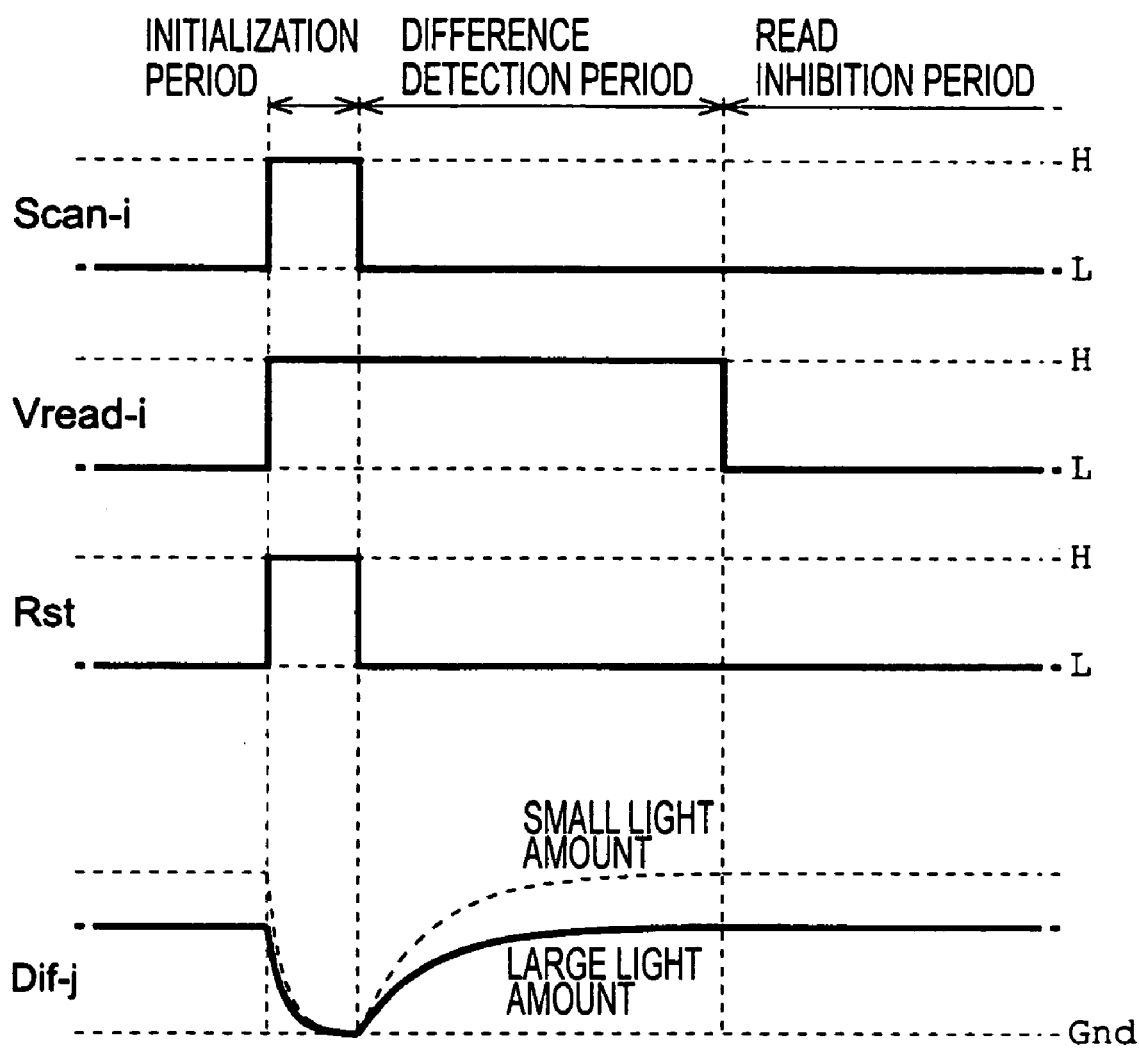
FIG. 7 is a diagram showing an operation of the optical sensor.

Next, the operation of the optical sensor 10 according to the above-described configuration will be described. FIG. 7 is a voltage waveform diagram of respective parts for illustrating the operation.

First, if the scanning signal Scan-i becomes the H level in the initialization period, the TFT 118 is turned on, such that the TFT 114 is brought into diode connection. Further, since the auxiliary scanning signal Vread-i becomes the H level in the initialization period, the switches 125 and 152 are turned on. For this reason, the reading line 121 is initialized to the potential Gnd and the electric charge stored in the capacitor Cd is cleared. Therefore, the differential voltage Dif-j as the output of the amplifier 154 is lowered to the potential Gnd as the electric charge is cleared.

Further, when the auxiliary scanning signal Vread-i becomes the H level, a current flows in a path of the auxiliary scanning line 141, the TFT 114, and the reading line 121. Thus, the node N becomes the threshold voltage $V_{thn}$ of the TFT 114, substantially regardless of the amount of received light of the photodiode 112.

Next, if the initialization period ends, the scanning signal Scan-i and the control signal Rst become the L level together, while the auxiliary scanning signal Vread-i maintains the H level.

If the scanning signal Scan-i becomes the L level, the TFT 118 is turned off, and, if the control signal Rst becomes the L level, the switches 125 and 152 are turned off. On the other hand, since the auxiliary scanning signal Vread-i maintains the H level, the conduction state between the source and the drain of the TFT 114 is determined according to the voltage of the node N. Here, as the amount of received light on the photodiode 112 is large, the voltage of the node N is lowered, which results in increasing the resistance between the source and the drain of the TFT 114.

The reading line 121 is strained to the auxiliary scanning signal Vread-i of H level according to the resistance between the source and the drain of the TFT 114 after being initialized to the potential Gnd. Thus, the larger the amount of received light on the photodiode 112 is, the lower a voltage build-up rate is. A voltage according to the change in voltage is present on the other end of the capacitor Cd and the amplifier 154 outputs the voltage as the differential voltage Dif-j.

Therefore, after the initialization period ends, the differential voltage Dif-j which is output in a period in which the auxiliary scanning signal Vread-i is at the H level is output without being influenced by the voltage stored in the parasitic capacitance (not shown in FIG. 6) of the gate of the TFT 114 or the parasitic capacitance Ca of the reading line 121. Further, in the third embodiment, similarly to the second embodiment, the current flowing between the source and the drain of the TFT 114 after the initialization period does not depend on the threshold voltage $V_{thn}$ of the TFT 114, similarly to the second embodiment. Thus, the differential voltage Dif-j is not influenced by the variation in the threshold voltage $V_{thn}$ characteristic of the TFT 114. For this reason, even when a plurality of cell circuits 100 are provided, for example, the variation in the threshold voltage $V_{thn}$ of the TFT 114 can be cancelled, and thus an output characteristic of the differential voltage Dif-j can be made uniform for each cell circuit.

Moreover, in a period in which the auxiliary scanning signal Vread-i is at the L level, the current does not flow along the above-described path, and thus the period serves as a read inhibition period in the third embodiment.

Further, in the third embodiment, the TFT 114 is the n-channel type, but it may be the p-channel type.

Fourth Embodiment

Figure 8:
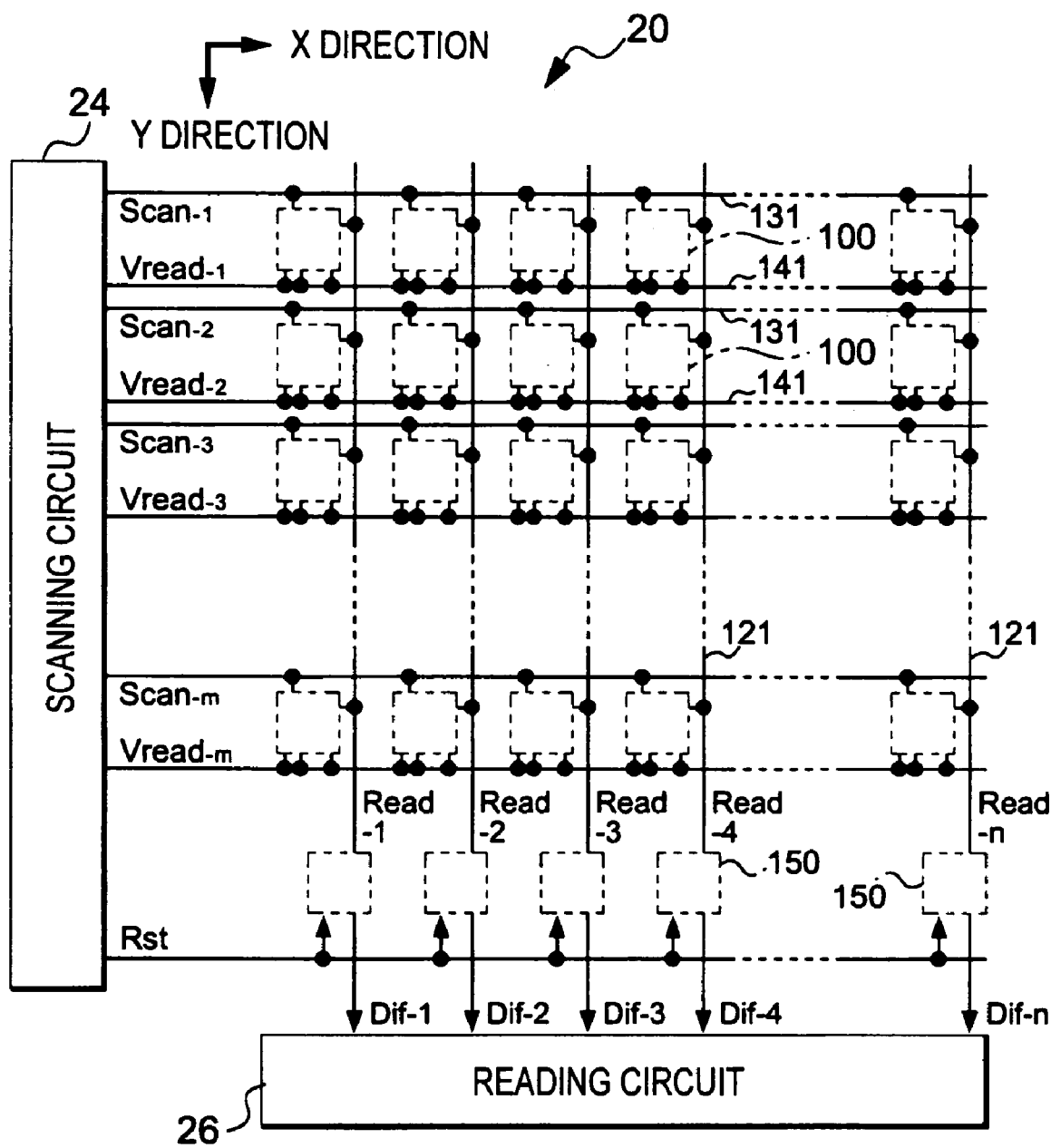
FIG. 8 is a diagram showing a configuration of a matrix-type optical sensor circuit according to a fourth embodiment of the invention.

In the above-described first to third embodiments, for convenience of the description, one cell circuit 100 is shown. However, in fact, it is practical that a plurality of cell circuits 100 are provided. Here, as a fourth embodiment, a matrix-type optical sensor circuit in which a plurality of cell circuits 110 are provided will be described. FIG. 8 is a block diagram showing the configuration of the matrix-type optical sensor circuit.

As shown in FIG. 8, in the matrix-type optical sensor circuit 20, a plurality of scanning lines 131 are arranged adjacent to one another in a horizontal direction (X direction) and a plurality of reading lines 121 are arranged adjacent to one another in a vertical direction (Y direction) in the drawing. Then, the cell circuits 100 are provided to correspond to intersections of the scanning lines 131 and the reading lines 121 respectively.

Here, for convenience of the description, in the embodiment, it is assumed that the number of the scanning lines 131 (the number of rows) is 'm', the number of the reading lines 121 (the number of columns) is n, and the cell circuits 100 are arranged in a matrix shape of m rows×n columns. However, the invention is not limited to this arrangement.

Moreover, as the cell circuit 100, any one of the first to third embodiments can be applied, but, here, a configuration in which the cell circuit 100 of the third embodiment (see FIG. 6) is applied is assumed. Therefore, the auxiliary scanning lines 141 are provided to correspond to the 1st to m-th scanning lines 131 respectively.

A scanning circuit 24 selects the scanning lines 131 row by row and supplies the H-level scanning signal to the selected scanning line 131. Further, the scanning circuit 24 supplies the auxiliary scanning signal synchronized with the selection to the auxiliary scanning line 141 and outputs the control signal Rst synchronized with the selection. Here, for convenience of the description, the scanning signal which is supplied to the i-th (where i is an integer satisfying the condition $1 \leq i \leq m$ and is used to illustrate the row in general) scanning line 131 is represented by Scan-i. Similarly, the auxiliary scanning signal which is supplied to the i-th auxiliary scanning line 141 is represented by Vread-i.

On the other hand, the differential voltage output circuits 150 are respectively provided at the one ends of the reading lines 121 to which the control signal Rst is supplied. Here, for convenience of the description, the differential voltage output from the differential voltage output circuit 150 of the j-th (where j is an integer satisfying the condition $1 \leq j \leq n$ and is used to illustrate the row in general) reading line 121 is represented by Dif-j in FIG. 8. The reading circuit 26 reads the differential voltages Dif-1, Dif-2, Dif-3, . . . , Dif-n output from the differential voltage output circuits 150 corresponding to the reading lines 121 and outputs them to the control system (not shown).

Moreover, in the configuration, the control signal Rst corresponds to a logical sum signal of the scanning signals Scan-1, Scan-2, Scan-3, . . . , Scan-m.

Figure 9:
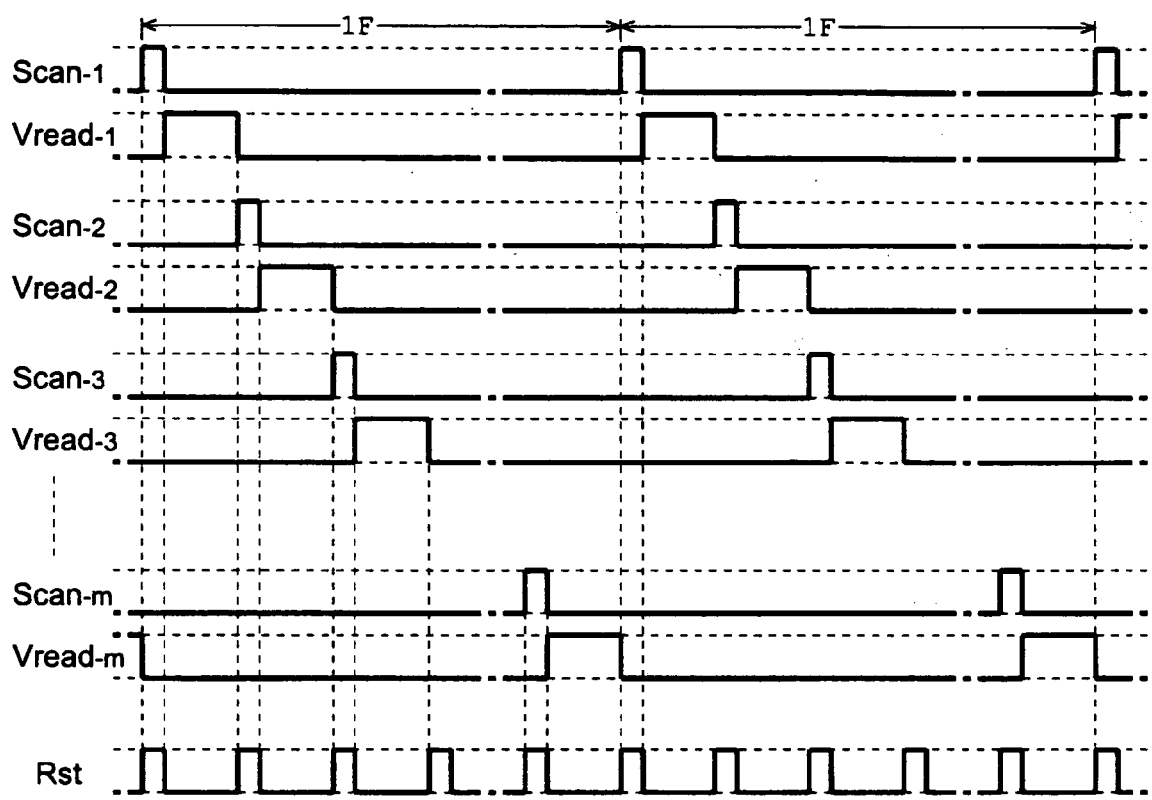
FIG. 9 is a timing chart showing an operation of the matrix-type optical sensor circuit.

Next, the operation of the matrix-type optical sensor circuit 20 having such a configuration will be described. FIG. 9 is a timing chart for illustrating the operation of the matrix-type optical sensor circuit 20.

As shown in FIG. 9, the scanning circuit 24 sequentially selects the 1st to m-th scanning lines 131 at a constant interval one by one and supplies the H-level scanning signal to the selected scanning line 131. Further, after the scanning line 131 is selected, the scanning circuit 24 makes the auxiliary scanning signal to the auxiliary scanning line 141 corresponding to the scanning line 131 the H level until a next scanning line 131 is selected.

Therefore, in the matrix-type optical sensor circuit 20, when the scanning line 131 is selected, the gate of the TFT 114 and the reading line 121 are initialized. Further, after the initialization, an operation of detecting the voltage on the reading line 121 is sequentially executed for the cell circuits 100 of each row in a time-sharing manner.

Moreover, in the fourth embodiment, the cell circuits 100 according to the third embodiment (see FIG. 6) are arranged in the matrix shape. Alternatively, when the cell circuit 100 according to the first embodiment (see FIG. 1) is applied, the auxiliary scanning line 141 and the differential voltage output circuit 150 or their substitutes are not required. Further, when the cell circuit 100 according to the second embodiment (see FIG. 4) is applied, the auxiliary scanning line 141 may be substituted with the feeding line 142 having a constant potential and the differential voltage output circuit 150 or its substitutes is not required.

On the other hand, in the respective embodiments, the cell circuit 100 has only a function of sensing the amount of received light, but it may include a function of the pixel of the display panel.

Figure 10:
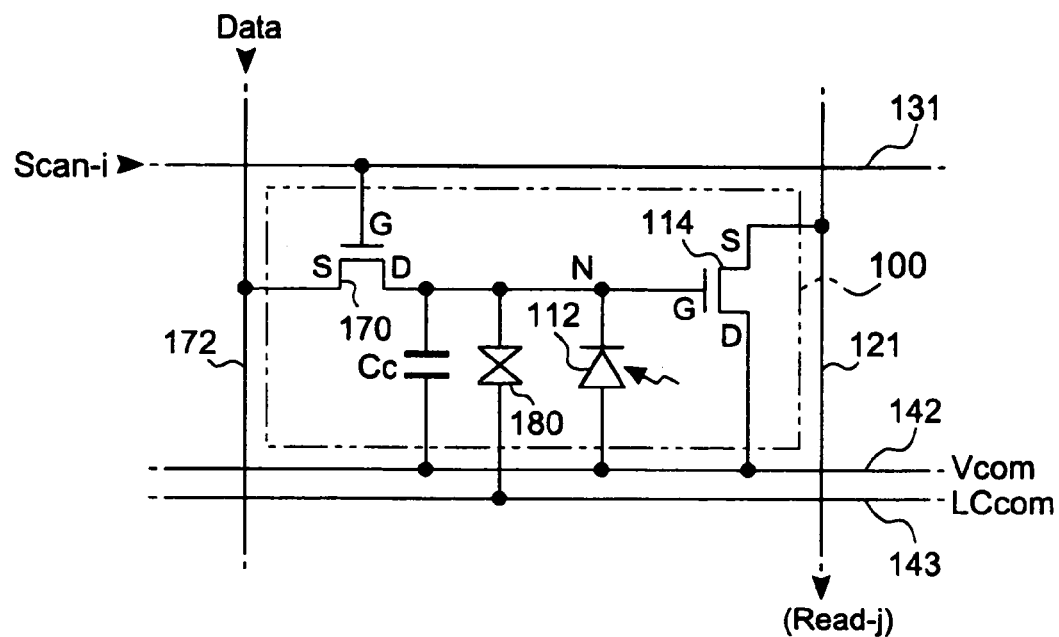
FIG. 10 is a diagram showing another example of a cell circuit.

For example, as shown in FIG. 10, the cell circuit 100 may include a liquid crystal element 180 and a TFT 170 which writes a voltage to be stored in the liquid crystal element. Here, as well known in a related art, the liquid crystal element 180 has a liquid crystal interposed between a pixel electrode provided separately for each pixel and a common electrode to which a constant voltage LCcom common to all pixels is applied. In the liquid crystal element 180, the amount of reflected light or the amount of transmitted light is changed according to the effective voltage value between both electrodes. Further, a gate of the n-channel-type TFT 170 is connected to the scanning line 131, a source thereof is connected to a data line 172, and a drain thereof is connected to the pixel electrode of the liquid crystal element 180. Moreover, a voltage Vcom is applied to the feeding line 142.

Here, in the cell circuit 100 shown in FIG. 10, a display mode and a received-light-amount detection mode are exclusively executed. In the display mode, when the scanning line 131 becomes the H level, the TFT 170 is turned on. Then, a voltage of a data signal Data supplied to the data line 172 is written into the pixel electrode of the liquid crystal element 180, such that the amount of reflected light or the amount of transmitted light of the liquid crystal element is changed according to the voltage.

Further, in the received-light-amount detection mode, when the scanning line 131 becomes the H level, the TFT 170 is turned on. Then, the initialization voltage supplied to the data line 172 is applied to the gate of the TFT 114. On the other hand, when the scanning line 131 becomes the L level, the gate of the TFT 114 has a voltage according to the amount of received light on the photodiode 112 and a voltage according to the above-described voltage is present on the reading line 121.

Figure 11:
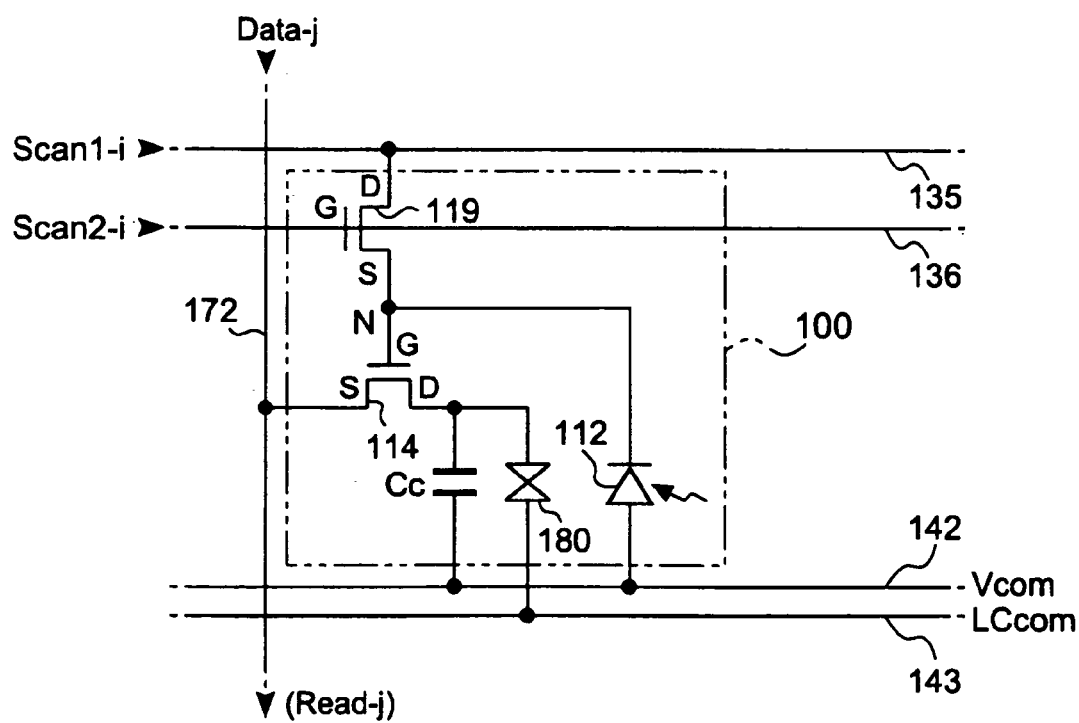
FIG. 11 is a diagram showing still another example of a cell circuit.

Further, for example, a cell circuit 100 as shown in FIG. 11 may be adopted.

In the configuration shown in FIG. 11, a TFT 119 is interposed between the gate of the TFT 114 (the node N) and a first scanning line 135, a gate of the TFT 119 is connected to a second scanning line 136, and the reading line 121 has also a function of the data line 172 in FIG. 10.

Then, in the configuration, the display mode and the received-light-amount detection mode are exclusively executed. Among them, in the display mode, when the first scanning line 135 and the second scanning line 136 become the H level together, the TFTs 114 and 119 are turned on together. Then, the voltage of the data signal Data supplied to the reading line 121 is written into the pixel electrode of the liquid crystal element 180, such that the amount of reflected light or the amount of transmitted light of the liquid crystal element is changed according to the voltage.

Further, in the received-light-amount detection mode, when the second scanning line 136 becomes the H level, the TFT 119 is turned on and the initialization voltage supplied to the reading line 121 is applied to the gate of the TFT 114, such that the initialization is performed. On the other hand, when the second scanning line 136 becomes the L level, the gate of the TFT 114 has a voltage according to the amount of received light on the photodiode 112 and a voltage according to the above-described voltage is present on the reading line 121.

Moreover, all cell circuits arranged in the matrix shape do not need to be the cell circuit 100 as shown in FIG. 10 or FIG. 11 (that is, the cell circuit 100 having the function of sensing the amount of received light and also the function of the pixel of the display panel). For example, all cell circuits 100 arranged in the matrix shape may have the function of the pixel such as the liquid crystal element 180, while the cell circuits 100 at the ratio of one to several to several hundreds of pixels may have the function of sensing the amount of received light. In such a manner, the aperture ratio of the pixel can be prevented from decreasing due to the function of sensing the amount of received light.

Further, instead of the liquid crystal element 180, an organic EL element, an inorganic EL element, a field emission (FE) element, or other light-emitting elements such as LEDs may be used. Further, a display element such as an electrophoretic element, an electrochromic element, or the like may be used.

Figure 12:
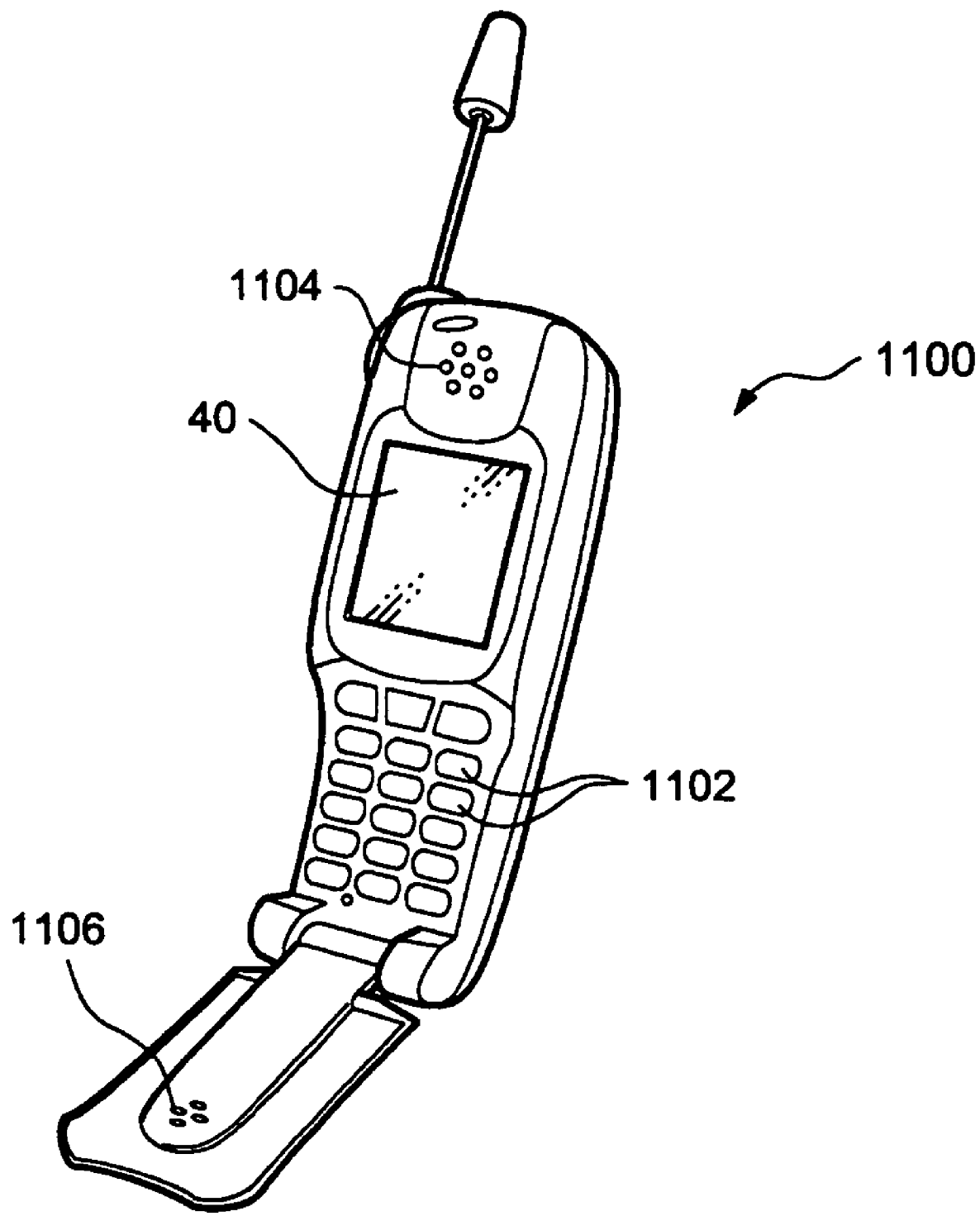
FIG. 12 is a diagram showing a cellular phone which uses the optical sensor.

Next, an electronic apparatus which uses a display panel having the above-described optical sensor 10 as a display unit will be described. FIG. 12 is a perspective view showing a configuration of a cellular phone which is an example of the electronic apparatus.

In FIG. 12, a cellular phone 1100 has a plurality of operating buttons 1102, a receiver 1104, a transmitter 1106, and a display panel 40 having the above-described optical sensor 10 as a display unit.

According to such a configuration, the optical sensor can be formed in the display panel, and thus an additional opening portion or a mounting space for providing the light-receiving element is not required.

Further, as the display panel 40, the matrix-type optical sensor circuit 20 in which the cell circuits 100 having the function of sensing the amount of received light and the function of the pixel of the display panel are arranged in the matrix shape may be used. If such a matrix-type optical sensor circuit 20 is used, even when light is irradiated onto only a portion of the display region, brightness or image quality of the display region can be uniformly controlled in the respective regions.

Moreover, as an electronic apparatus, in addition to the cellular phone of FIG. 12, a digital still camera, a television, a viewfinder-type or monitor-direct-view-type video tape recorder, a car navigation device, a pager, an electronic organizer, an electronic calculator, a word processor, a workstation, a videophone, a POS terminal, an apparatus having a touch panel, or the like is exemplified. Then, it is needless to say that the above-described matrix-type optical sensor circuit 20 can be applied as the display units of these electronic apparatuses. Further, the invention is not limited to a display unit of an electronic apparatus that directly displays an image or a character. For example, the invention can be applied to a light source of a printing apparatus which is used to indirectly form an image or a character by irradiating light onto a subject, for example, for a line head of an LED printer.

What is claimed is:

1. An optical sensor which is provided corresponding to a scanning line and a reading line, the optical sensor comprising:
   a light-receiving element, a current flowing between both terminals thereof being changed according to the amount of incident light; and
   a transistor whose gate is connected to one end of the light-receiving element, one of a source and a drain being connected to the scanning line and the other being connected to the reading line,
   wherein, in an initialization period in which the scanning line is selected, an initialization voltage according to a threshold voltage of the transistor is applied to the gate of the transistor and,
   after the application of the initialization voltage ends, a result according to the amount of received light is outputted based on a voltage on the reading line.

2. The optical sensor according to claim 1:
   wherein the time until the voltage on the reading line reaches the threshold voltage after the application of the initialization voltage ends indicates the amount of received light received by the light-receiving element.

3. The optical sensor according to claim 1, further comprising:
   a first switching element that applies a predetermined voltage to the reading line before the result according to the amount of received light is outputted.

4. The optical sensor according to claim 1,
   wherein the light-receiving element is a diode element that is forward biased in the initialization period to apply the initialization voltage to the gate of the transistor and is reverse biased after the initialization period ends.

5. The optical sensor according to claim 1, further comprising:
   a first switching element that is turned on in the initialization period to bring the transistor into diode connection and to apply the initialization voltage to the gate of the transistor.

6. The optical sensor according to claim 5,
   wherein the first switching element is turned on or off according to the level of a voltage which is supplied to the scanning line.

7. The optical sensor according to claim 1, further comprising:
   a capacitor, one end of which is connected to the reading line; and
   a first switching element that electrically shorts both ends of the capacitor in the initialization period, wherein, after the application of the initialization voltage ends, a voltage present on the other end of the capacitor is outputted as the result according to the amount of received light.

8. A method of reading an optical sensor which is provided corresponding to a scanning line and a reading line and which has a light-receiving element, a current flowing between both terminals thereof being changed according to the amount of incident light, and a transistor whose gate is connected to one end of the light-receiving element, one of a source and a drain thereof being connected to the scanning line and the other being connected to the reading line, the method comprising:

applying an initialization voltage according to a threshold voltage of the transistor to the gate of the transistor in an initialization period in which the scanning line is selected; and outputting a result according to the amount of received light based on a voltage on the reading line after the application of the initialization voltage ends.

9. A matrix-type optical sensor circuit comprising:

cell circuits that are provided corresponding to a plurality of scanning lines and a plurality of reading lines;

a scanning circuit that selects one scanning line among the plurality of scanning lines in an initialization period, deselects all scanning lines in a subsequent detection period, and selects another scanning line in a next initialization period; and a reading circuit that reads a voltage on a reading line or a current flowing in the reading line in the detection period as an output signal of an optical sensor which is disposed on the selected scanning line, wherein each of the cell circuits has:

a light-receiving element, a current flowing between both terminals thereof being changed according to the amount of incident light; and a transistor whose gate is connected to one end of the light-receiving element, one of a source and a drain thereof being connected to the scanning line and the other being connected to the reading line.

10. An electronic apparatus, comprising:

an optical sensor comprising:

a light-receiving element, a current flowing between both terminals thereof being changed according to the amount of incident light; and a transistor whose gate is connected to one end of the light-receiving element, one of a source and a drain being connected to the scanning line and the other being connected to the reading line, wherein, in an initialization period in which the scanning line is selected, an initialization voltage according to a threshold voltage of the transistor is applied to the gate of the transistor and, after the application of the initialization voltage ends, a result according to the amount of received light is outputted based on a voltaae on the reading line.

11. An electronic apparatus, comprising:

a matrix-type optical sensor circuit comprising:

cell circuits that are provided corresponding to a plurality of scanning lines and a plurality of reading lines;

a scanning circuit that selects one scanning line among the plurality of scanning lines in an initialization period, deselects all scanning lines in a subsequent detection period, and selects another scanning line in a next initialization period; and a reading circuit that reads a voltage on a reading line or a current flowing in the reading line in the detection period as an output signal of an optical sensor which is disposed on the selected scanning line, wherein each of the cell circuits has:

a light-receiving element, a current flowing between both terminals thereof being chanced according to the amount of incident light; and a transistor whose gate is connected to one end of the light-receiving element, one of a source and a drain thereof being connected to the scanning line and the other being connected to the reading line.

* * * * *